United States Patent
van den Berg et al.

(10) Patent No.: US 6,197,538 B1
(45) Date of Patent: Mar. 6, 2001

(54) METHOD OF ESTABLISHING THE PRESENCE OF SPECIFIC SUBSTANCES IN MILK AND AN IMPLEMENT FOR APPLYING SAME

(75) Inventors: Karel van den Berg, Bleskensgraaf; Helena G. M. Vijverberg, Schiedam; Wilco van Lier, Delft, all of (NL)

(73) Assignee: Maasland N.V. a Dutch Company (NL)

( * ) Notice: Subject to any disclaimer, the term of this patent is extended or adjusted under 35 U.S.C. 154(b) by 0 days.

(21) Appl. No.: 09/437,314

(22) Filed: Nov. 10, 1999

(30) Foreign Application Priority Data

Nov. 12, 1998 (NL) .................................................... 1010540

(51) Int. Cl.⁷ ................ C12Q 1/04; C12Q 1/00; C12Q 1/54; G01N 33/53

(52) U.S. Cl. ................ 435/34; 435/14; 435/968; 435/283.1; 435/4; 422/50; 422/68.1

(58) Field of Search .................. 435/34, 14, 968, 435/283.1, 4; 422/50, 68.1

(56) References Cited

U.S. PATENT DOCUMENTS 5,116,119 * 5/1992 Brayer .............................. 435/283.1

* cited by examiner

Primary Examiner—Louise N. Leary
(74) Attorney, Agent, or Firm—Penrose Lucas Albright

(57) ABSTRACT

A method and apparatus for ascertaining and measuring the quality of milk by analyzing reflected or absorbed colors or both with which the milk is irradiated. The milk is thus irradiated with three colors of light in wavelengths of red, green and blue and the intensity and color of the light reflected by the milk or absorbed thereby, or both, is measured. The light sources are periodically switched off whereby the receiving sensors measure the same red, green and blue wavelengths due to background sources to the extent that they are reflected or absorbed or both by the milk. This data is then compared with data with the light sources switched on to produce the net data which is relevant to the milk as it is being received from the animal being milked. The net measurements provide a basis for ongoing evaluations of the quality of the milk being received from the animal; they are capable of indicating blood, urine, excrement, other contaminants, e-coli bacteria, hormones, rinsing liquid, air, and conditions such as mastitis and colostrum or grass milk which is milk produced after consumption of grass by the animal.

72 Claims, 2 Drawing Sheets

METHOD OF ESTABLISHING THE PRESENCE OF SPECIFIC SUBSTANCES IN MILK AND AN IMPLEMENT FOR APPLYING SAME

FIELD OF THE INVENTION

The invention relates to a method of determining the quality or the composition or both of milk by means of measurements.

BACKGROUND OF THE INVENTION

Such a method if known from the German offenlegungsschrift 27 59 126 in which a light source is described that irradiates the milk and in which a light-sensitive element is described by means of which a color change of the milk is determined. When the milk shows a deviating color, such as due to the presence of blood or pus, the milk is separated and collected in a separate reservoir. This method has the disadvantage that only rough deviations in the color of the milk can be determined and that subtle color differences, such as due to the presence of exiguous contaminations or as a result of the fact that the animal has consumed grass, instead of concentrate, are not detected.

An alternative method is known from the document Dutch Application NL 1004980. This document discloses a method in which the intensity values of a number of colors in the milk are determined and in which the milk is produced by individual animals. By comparing the intensity values with the values recorded during previous milkings, the presence of specific substances, such as contaminates can be determined. This method has the disadvantage that the intensity values of the milk vary to a great extent, depending on the amount of surrounding light. Moreover, the results cannot be interpreted quantitatively, as only changes relative to previous milkings are recorded.

Finally document Dutch Application NL 94022010 describes a sensor for the detection of contaminates in the milking systems of a milking machine, making use of radioactive radiation or ultrasonic sound. This sensor has the disadvantage of only being suitable for detecting contaminates in the milk and not being able to perform other qualitative measurements on the milk, such as detecting blood, diagnosing mastitis or determining the cell count.

SUMMARY OF THE INVENTION

The invention aims to obviate the above-mentioned drawbacks or at least to minimize same. In accordance with the invention this is achieved in that one or more sources irradiate the milk consecutively or simultaneously with radiation of one or more different wavelengths or different intensities or both, while, during at least part of the time when the sources are switched on, one or more receivers determine one or more reflected or adsorbed or both radiation intensities received during a period of time. The values of the thus obtained radiation intensities are stored in a memory and are compared mutually as well as with previous values recorded during one or more previous measurements, whereupon the results of this comparison process are displayed. Because of the fact that during the measurements, the sources irradiate the milk simultaneously or consecutively with radiation of different wavelengths or different intensities or both, and the different reflected or adsorbed or both radiation intensities are determined during a period of time, color changes are detected over a wider wavelength range. This has the advantage that subtle color changes can be detected, such as in the case that small quantities of blood, pus, rinsing liquid or urine are present in the milk. Another advantage of irradiating the milk by a source is that disturbances of the detected radiation intensities by the presence of the radiation sources in the neighborhood, such as the lamps in the shed or the sunlight are available.

During a measurement one or more sources can be switched off, while, during at least part of the time when the sources are switched off, one or more receivers determine one or more background reflected or absorbed or both radiation intensities during a period of time. The values of the thus obtained radiation intensities are stored as background values in a memory. The background values are incorporated in the values obtained during the period of time when one or more sources are switched on and the values are modified by the background values are stored in a memory. In this manner the radiation intensity of the background is established. This makes it possible to correct the radiation intensities that are measured when the sources are switched on. In a preferred embodiment the periods of time for establishing the reflected or absorbed or both radiation intensities are constant. In this manner, the radiation intensities as so determined, can easily be compared in one or more receivers. One or more values of one or more determinations of reflected or absorbed or both radiation intensities can be stored in a memory, so that the values can be compared with previously obtained values.

On the basis of the values of determinations of radiation intensities one or more proportions of the values are ascertainable and may be used in lieu of full valves. A calibration value is formed by the progressive average of the values or proportions or both of the values obtained for a specific animal during a defined number of most recent milkings. A calibration value can also be formed by one or more measurements of a calibration means such as a transparent liquid, a reference milk, a calibration rod, white paper, a white tile, rinsing liquid or water. The values can also be compared with previous calibration values. In a preferred embodiment, the values or proportions or both of values are compared, both mutually and with previously ascertained values including calibration values or proportions recorded during one or more previous measurements, and the results of this comparison process are made available to an operator. According to an inventive feature, the results of the comparison process are displayed in such a manner that the presence or concentrations or both of specific substances, such as contaminates in the milk, can be read immediately.

According to a further inventive feature, one or more further receivers receive the radiation directly from the source, and the value obtained by the first receiver is adjusted with the aid of one or more values obtained by the further receivers. In this manner it is possible to determine the intensity of the radiation emitted by the source. When the source ages, which is not only relevant to radioactive sources, but also to incandescent lamps, or when the source is contaminated, the intensity of the radiation will decrease. This will affect the value of the source's radiation intensity. Said value can be corrected by means of the value of the radiation intensity of a further receiver. It is also possible to adjust one or more proportions of values by means of values obtained by one or more further receivers receiving the radiation directly from the source.

In a preferred embodiment one or more sources and one or more receivers are coupled to be a periodic signal, such as a square signal or a saw-tooth signal, one or more receivers determining the radiation intensity when one or more sources have attained an almost constant intensity. By means of the periodic signal there is achieved a synchronization of the sources and the receivers. First the source is switched on, whereupon the receiver establishes the radiation intensity. Many sources have warm-up time before attaining a constant or maximum intensity. After the warm-up time has elapsed, it is possible for the receiver to establish the radiation intensity. The source can also be turned on directly by the periodic signal.

According to another inventive feature, one or more sources comprise light sources emitting radiation having one or more discrete wavelengths relate to the absorption characteristic of specific substances in the milk, such as proteins or fats, and one or more receivers determine the radiation intensity, and the present or concentration or both of one or more substances in the milk is ascertained. In this way the milk is irradiated with a radiation having a wavelength which is absorbed by specific substances in the milk. By comparing the intensity of the emitted radiation with the radiation received by the receiver, it is possible to determine the light absorption of a specific wavelength. Thus it is possible not only to demonstrate the presence of a specific substance, but also to determine the concentration of said substance.

In accordance with an inventive feature, the measurement of milk composition involves the determination of the presence or quantity or both of one or more of the following substances: blood, urine, excrements, contaminates, Ecoli bacteria, hormones, flocks, rinsing liquid and air. All these substances can be analyzed by measuring the reflected or absorbed or both radiations of or from the source. In addition, the measurements may also comprise determination of fat content or cell count or mastitis or colostrum or grass milk (milk produced after the consumption of grass) on any combination thereof.

In a preferred embodiment, measurements are made of milk produced by individual animals. In this manner it is possible to check the quality of the milk of an individual animal. When the animal is in heat, or is in an adverse condition, such as due to illness, circumstance may be detected in a timely manner. The measurements can also be made. for milk from separate udder quarters. The resulting values or proportions of values can be compared mutually as well as with previous values or values obtained from different udder quarters, or any combination thereof and the results of the comparison can be indicated by, for example, being displayed on a monitor. In this manner it is possible for example to effect a timely separation of milk containing blood or pus yielded from an udder quarter before it is mixed with wholesome milk yielded from the other quarters.

According to a further inventive feature, one or more measurements are made when the flow sensor indicates that the milk is flowing. In this manner the desired measurements are made during milking. In a preferred embodiment, one or more sources comprise light sources which irradiate the milk consecutively or simultaneously with red-colored, green-colored, blue-colored light, and which are switched off consecutively or simultaneously. According to a further inventive feature, the proportions RG, RB and GB of the established radiation intensities are calculated as RG=(r−a)/(g−a), RB=(r−a/(b−a), GB=(g−a)/(b−1), r being the established radiation intensity during irradiations of the milk by one or more sources of red-colored light, g being the established radiation intensity during irradiation of the milk by one or more sources of green-colored light, b being the established radiation intensity during irradiation of the milk by one or more sources of blue-colored light and a being the established radiation intensity during the period of time when one or more light sources are switched off.

The proportions RG, RB and GB can be multiplied by correction factors depending on the calibration values. These calibrations values can be based on measurements of reference liquids. The proportions can also be multiplied by the values of the radiation intensities established by the further receivers receiving radiations directly from the light source.

In a further embodiment, an animal's feeding can be based on measurements of the animal's milk. By measuring the milk it may be determined that, for example, the color green has a rather high intensity. This is an indication that the animal has consumed grass instead of the usual portions of concentrate.

The invention relates not only to a method but also to an apparatus for applying the above described method of determining the quality of the milk by means of measurements. For that purpose the apparatus is characterized in that it comprises a color measuring system provided with one or more sensors comprising one or more sources for irradiating the milk with electromagnetic radiation of one of more different wavelengths or different intensities or both, while, during at least part of the time when the sources are active, one or more receivers determine the radiation intensity for a predetermined period of time. One or more sources can be turned-off, while, during at least part of the time when the sources are turned-off, one or more receivers ascertain the radiation intensity during a predetermined period of time. The sensors may be located at various places in the milking system, while the sources each emit a radiation having a different wavelength or intensity or both. However, the sources may also be located at the same place, in which case the sources can be activated consecutively, for example. One or more sources can emit phase-modulated or frequency-modulated radiation. This has the advantage that the signal from the source is less disturbed by the surroundings. For that purpose one or more receivers may be provided with demodulation means. The demodulation means may comprise a filter, such as an active filter or an optical filter.

According to another inventive feature, one or more sources comprise one or more light emitting diodes (LEDS) being capable of emitting one or more colors of light. An example of such a multicolor LED is the LF95EMBGMBC manufactured by Kingbright. In a preferred embodiment one or more LEDs are turned on by means of a periodic signal, such as a saw-tooth signal or a square signal. The frequency of the periodic signal is greater than or identical to the duration of time for the source to attain a constant or maximum intensity or both. In this manner warm-up time after actuating the source is avoided.

In accordance with another inventive feature, one or more receivers comprise a photodiode or a light-sensitive resistance or a photomultiplier or a phototransistor or a PIN-diode. A suitable receiver is the optical sensor with built-in amplifier, TSL250. In a suitable embodiment one or more amplifiers are provided with screening means. These screening means serve to protect the receiver from radiation emanating directly from the source. In another embodiment one or more sensors are provided with one or more further receivers receiving the radiation from the LED directly. One or more LEDs may be provided with a ground lens or a diffuse lens.

According to an inventive feature, one or more sources and one or more receivers are disposed one beside the other or at a distance of less than the diameter of the milk line. In this manner the signal from the source can easily reach the receiver. According to another inventive feature, one or more sources and one or more receivers are located opposite each other. In that case the radiation absorbed by the milk is determined by the receivers. One or more sensors may also be disposed in the milk, or in one or more milk lines or on the wall thereof. Finally one or more sensors may be disposed in a milk glass.

In accordance with another inventive feature, the sensor is coupled to a flow-meter. In this manner it is possible to make measurements only on flowing milk. According to yet another inventive feature, the calibration of the apparatus is performed by means of computer hardware or software or both. This has the advantage that rough settings can be performed by means of hardware and fine settings can be performed by means of software on the basis of previously established values or calibration values or both.

According to a still further inventive feature, the invention also comprises a milking machine provided with a milking robot characterized in that the milking machine is provided with an apparatus as described in the foregoing or an apparatus which is suitable for applying one or more of the aforementioned methods or both. In this manner the color measuring system can be used to monitor the quality of the milk. This is important because when milking takes place fully automatically, a person to check the quality of the milk visually is not continuously present.

BRIEF DESCRIPTION OF THE DRAWINGS

The invention will now be explained in further detail with reference to the accompanying drawings, in which.

DETAILED DESCRIPTION OF THE PREFERRED EMBODIMENTS

Figure 1:
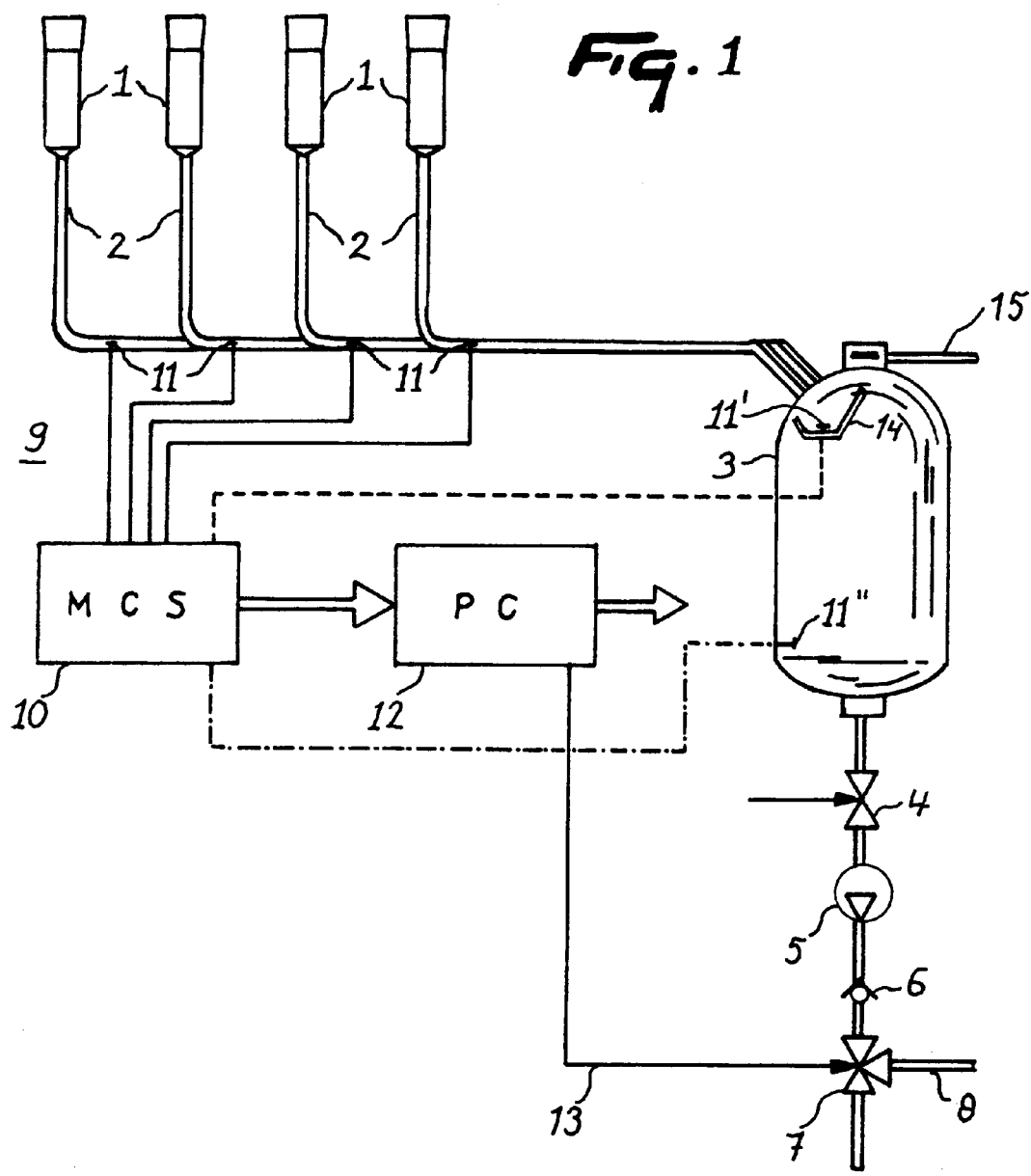
FIG. 1 shows a milking system provided with the color measuring system in accordance with the invention.

FIG. 1 shows four teat cups 1 to be connected to the teats of an animal to be milked, the milk lines 2 of said teat cups 1 debauching into a milk glass 3. To milk glass 3 there is further connected a vacuum line 15 for the purpose of creating a vacuum in milk glass 3 as such, in milk lines 2 and in the teat cups 1, said vacuum being required to keep the teat cups connected to the teats of the animal, to milk and to separate the milk from the air present therein. From milk glass 3, the milk obtained is discharged, via a valve 4, a pump 5, a non-return valve 6 and a three-way valve 7, through a line 8 to a milk tank.

In the figure there is further indicated a color measuring system 9 comprising a processing unit 10 to which four color sensors 22 are connected. These sensors 11 are preferably disposed on milk lines 2 of individual teat cups 1. In other embodiments sensors 11' and 11" may also be disposed in milk glass 3, in the milk, or in an overflow reservoir 14. The processing unit records the values measured by the sensors. These measured values can be transmitted to a computer 12 to be processed further.

Figure 2:
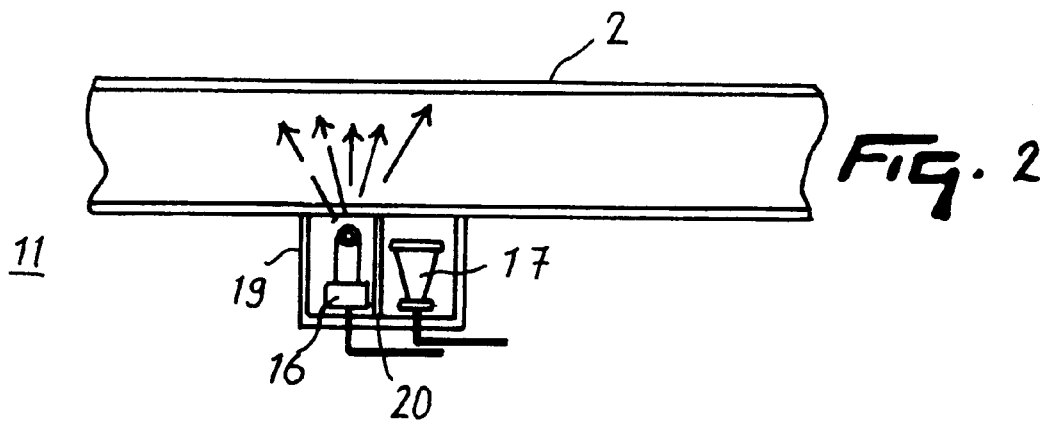
FIG. 2 shows a milk line on which there is disposed a sensor in accordance with the invention.

FIG. 2 shows a sensor 11 which is included in a milk line 2. This sensor 11 consists of a light source 16 and a receiver 17, disposed together in a housing 19. Receiver 17 is provided with screening means, so that only the light from light source 16 is reflected by the milk is received by receiver 17. Housing 19 is preferably designed such that the light source and the receiver are screened from surrounding light. In a preferred embodiment the light source is a multicolor LED by means of which the milk can be irradiated with different colors of light. The LED can be activated by means of a periodic signal, such as a square signal or a saw-tooth signal. The receiver can also be coupled to this signal, so that both the source and the receiver are synchronized. Each time when the source attains a constant intensity, the reflected or absorbed or both amount or amounts of radiation are determined by the receiver.

Figure 3:
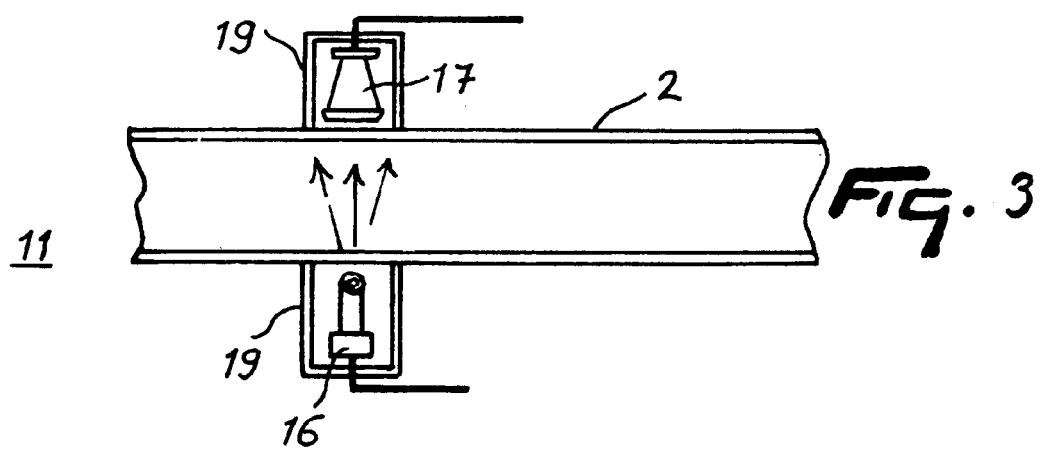
FIG. 3 shows a alternative embodiment of the sensor of FIG. 2.

FIG. 3 show a sensor in an arrangement in which receiver 17 is located opposite the source 16. In this case the quality of the milk is measured by means of the absorption of radiation of different wavelengths. In this situation the absorbed quantity of light of specific wavelengths is a measure for the presence or concentration or both of specific substances in the milk. Both the source and the receiver are accommodated in a separate housing.

Figure 4:
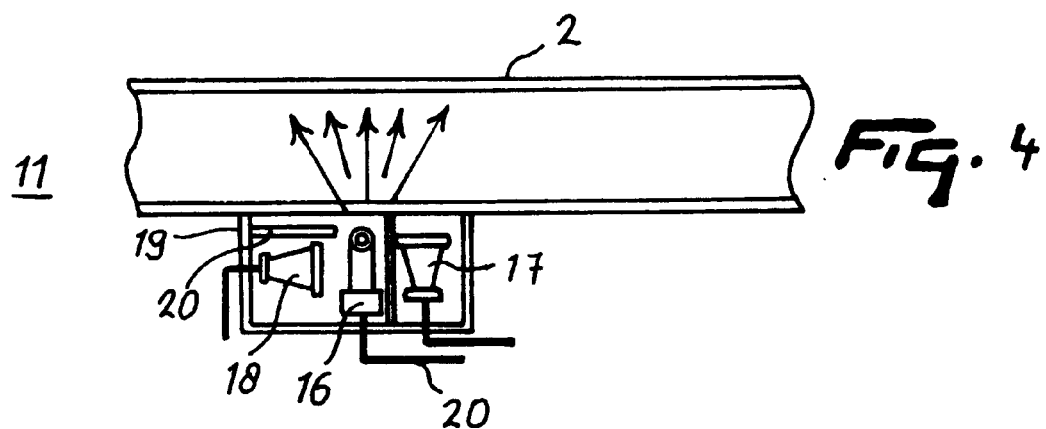
FIG. 4 shows another embodiment of the sensor.

FIG. 4 finally shows an alternative embodiment in which a further receiver 18 is disposed in the sensor, which further receiver 18 measures the radiation directly from the source. In this manner when the intensity of the radiation emitted by the source ages, or when the source is contaminated, the intensity of the radiation decreases. This will affect the value of the intensity radiation from the source. Said value can be corrected by appropriately increasing the value of the radiation intensity measurement of radiation received by the further receiver.

Although we have disclosed the preferred embodiments of our invention, it is to be understood that it is capable of other adaptation and modifications within the scope of the following claims:

Having disclosed our invention, what we claim as new and to be secured by Letters Patent of the United States of America is:

1. A method of determining the distinctive characteristics of milk as milk is received from an animal by means of measurements, which comprises the steps of irradiating the milk selectively with electromagnetic radiations of different wavelengths or different intensities, or both, while selectively recording values of reflected or absorbed radiation intensities, or both, therefrom, storing said values of said reflected or absorbed radiations or intensities or both in a memory, and comparing said values so recorded and stored mutually in said memory and with previous similar values recorded and stored during previous measurements of milk received from said animal, and displaying the results of such comparisons.

2. The method in accordance with claim 1, wherein the irradiating of said milk by said electromagnetic radiations are temporarily ceased while the values of the reflected or absorbed or both radiation intensities continue to be measured and recorded during the period of temporary cessation, storing the values thus obtained as background values in a memory, associating said background values with the values obtained during the period of time when said milk was being irradiated and adjusting the values in said memory by removing the effect of said background values from said values obtained during said irradiating of said milk which are stored in said memory.

3. An apparatus for determining the quality of milk which comprises a color measuring system that includes a sensor having an electromagnetic radiation source irradiating the milk with radiation of a predetermined wavelength and intensity, switch means for switching said source on and off, receiver means for measuring the effect of said radiation while said source is switched off to record the value of the effect of background radiation of said wavelength received by said milk, and for measuring the effect of radiation of said wavelength on said milk from said source when said source is switched on, and computer means for comparing and deleting the effect of said background radiation on said milk whereby the quality of milk is determined by radiation of said wavelength from said source substantially unaffected by said background radiation.

4. The apparatus in accordance with claim 3, wherein during at least part of the time when said radiation source is switched off said receiver means establishes the extent said background radiation in said wavelength's intensity affects said milk.

5. The method in accordance with claim 2, wherein the values stored in said memory comprise proportions of the values which are received to be recorded.

6. The method in accordance with claim 5, wherein for a specific animal's milk a calibration value is determined which is based on the progressive average of the proportions of said received values of said background radiation which have been recorded during a predetermined number of the most recent milkings of such animal.

7. The method in accordance with claim 1, which further comprises determining a calibration value which corresponds selectively to the effect of said different wavelengths or of said different intensities or to both from said electromagnetic radiations by a calibration means which consists of one or more of the following: a transparent liquid, a reference milk, a calibration rod, a rinsing liquid, and water.

8. The method in accordance with claim 2, wherein said values are compared with previously determined calibration values.

9. The method in accordance with claim 8, wherein the results received from comparing said values with previous calibration values are displayed.

10. The method in accordance with claim 9, wherein when said results indicate the presence and concentration of undesired substances in the milk, said results are displayed in such a manner that said presence of undesired substances can be read immediately.

11. The method in accordance with claim 1, which comprises the step of further receiving said electromagnetic radiations and comparing it with electromagnetic radiations at the same wavelengths reflected or absorbed by said milk.

12. The method in accordance with claim 2, which comprises the step of receiving said electromagnetic radiations at said wavelengths directly from a source and using the results so obtained to adjust said background values further.

13. The method in accordance with claim 2, comprising sources of said electromagnetic radiations which are switched on and off to form a periodic signal.

14. The method in accordance with claim 13, wherein said periodic signal is a square signal.

15. The method in accordance with claim 13, wherein said periodic signal is a saw-tooth signal.

16. The method as claimed in claim 1, wherein said electromagnetic radiation wavelengths relate to the absorption characteristics of specific substances in said milk whereby the values of said specific substances are determined.

17. The method in accordance with claim 16, wherein said specific substances comprise proteins.

18. The method in accordance with claim 16, wherein said specific substances comprise fats.

19. The method in accordance with claim 1, wherein said measurements include determining the presence of undesired substances in said milk.

20. The method in accordance with claim 19, wherein a said undesired substance comprises blood.

21. The method in accordance with claim 19, wherein a said undesired substance comprises urine.

22. The method in accordance with claim 19, wherein a said undesired substance comprises excrement.

23. The method in accordance with claim 19, wherein said undesired substances comprise contaminants.

24. The method in accordance with claim 19, wherein a said undesired substance comprises e-coli bacteria.

25. The method in accordance with claim 19, wherein said substances comprise hormones.

26. The method in accordance with claim 19, wherein a said undesired substance comprises flocks.

27. The method in accordance with claim 19, wherein a said undesired substance comprises rinsing liquid.

28. The method in accordance with claim 19, wherein a said undesired substance comprises air.

29. The method in accordance with claim 1, wherein the method comprises measuring the fat content in the milk.

30. The method in accordance with claim 1, wherein the method comprises measuring the cell count of the milk.

31. The method in accordance with claim 1, wherein the method comprises detecting the presence of mastitis in the animal being milked.

32. The method in accordance with claim 1, wherein the method comprises detecting colostrum in the animal being milked.

33. The method in accordance with claim 1, wherein the method comprises ascertaining that the milk being produced by an animal being milked is grass milk which is milk produced after the consumption of grass by the animal.

34. The method in accordance with claim 1, wherein the method comprises providing individual measurements of milk from individual animals while being milked.

35. The method in accordance with claim 1, wherein the method comprises providing measurements from separate udder quarters of the animal being milked.

36. The method in accordance with claim 35, wherein the values obtained by the method for different udder quarters are compared and the results of such comparisons are displayed.

37. The method in accordance with claim 1, comprising the step of sensing the flow of milk from said animal being milked and wherein said measurements are made only when said milk is flowing from said animal.

38. The method in accordance with claim 1, wherein said electromagnetic radiations are in the wavelengths of red, blue and green and are switched on and off substantially simultaneously.

39. The method in accordance with claim 1, wherein said electromagnetic radiations are in the wavelengths of red, green and blue and are switched on and off consecutively.

40. The method in accordance with claim 1, wherein said electromagnetic radiations of different wavelengths comprise radiation intensities in light wavelengths of red (R), green (G) and blue (B), the proportions RG, RB and GB of the radiation intensities being calculated as $RG=(r-a)/(g-a)$, $RB=(r-a)/(b-a)$, and $GB=(g-a)/(b-a)$, "r" being the radiation intensity during irradiation of the milk by a red wavelength light, "g" being the radiation intensity during irradiation of the milk by a green wavelength light, "b" being the radiation intensity during irradiation of the milk by the blue wavelength light, and "a" being the radiation intensity during the period that said milk is not being irradiated by said red, green and blue wavelengths of light.

41. The method in accordance with claim 40, which comprises the providing of calibration values for said red, green and blue wavelengths, the proportions RG, RB and GB being multiplied by correction factors derived from said calibration values.

42. The method in accordance with claim 1, comprising the further step of feeding said animal, said feeding being based at least in part on measurements of said animal's milk as provided by the method.

43. The apparatus in accordance with claim 3, wherein said source emits phase-modulated radiation.

44. The apparatus in accordance with claim 3, wherein said source emits frequency-modulated radiation.

45. The apparatus in accordance with claim 43, wherein said receiver means comprises demodulation means.

46. The apparatus in accordance with claim 44, wherein said receiver means is provided with demodulation means.

47. The implement in accordance with claim 3, wherein said source emits a modulated radiation and said receiver means comprises demodulation means which comprises a filter.

48. The apparatus in accordance with claim 47, wherein said filter comprises an active filter.

49. The apparatus in accordance with claim 47, wherein said filter comprises an optical filter.

50. The apparatus in accordance with claim 3, wherein said source comprises a light emitting diode.

51. The apparatus in accordance with claim 50, wherein said light emitting diode is controlled by a periodic signal.

52. The apparatus in accordance with claim 51, wherein said periodic signal comprises a saw-tooth signal.

53. The apparatus in accordance with claim 51, wherein said periodic signal comprises a square signal.

54. The apparatus in accordance with claim 51, wherein the frequency of said periodic signal is not less than the duration of time for said light emitting diode to attain at least substantially its maximum intensity.

55. The apparatus in accordance with claim 3, wherein said receiver means is activated by electromagnetic radiations.

56. The apparatus in accordance with claim 55, wherein said receiver means comprises a photo diode.

57. The apparatus in accordance with claim 55, wherein said receiver means comprises a light-sensitive resistance.

58. The apparatus in accordance with claim 55, wherein said receiver means comprises a photo multiplier.

59. The apparatus in accordance with claim 55, wherein said receiver means comprises a photo transistor.

60. The apparatus in accordance with claim 55, wherein said receiver means comprises a PIN-diode.

61. The apparatus in accordance with claim 3, which further comprises screening means, said receiver means being provided with said screening means.

62. The apparatus in accordance with claim 50, wherein said receiver means comprises a sensor member, said sensor member receiving said radiation directly from said light emitting diode.

63. The apparatus in accordance with claim 50, wherein said light-emitting diode is provided with a ground lens.

64. The apparatus in accordance with claim 50, wherein said light emitting diode is provided with a diffuse lens.

65. The apparatus in accordance with claim 3, which comprises a milking machine that includes a milk line, said receiver means and said source being disposed relative to each other by a distance which is less than the diameter of said milk line.

66. The apparatus means in accordance with claim 3, wherein said source and said receiver means are located opposite each other.

67. The apparatus in accordance with claim 3, wherein said sensor is disposed in the milk which is being measured.

68. The apparatus in accordance with claim 3, which comprises a milking machine and a milk line connected thereto, said sensor being disposed on said milk line.

69. The apparatus in accordance with claim 3, which comprises a milk flow meter, said sensor being coupled to said milk flow meter.

70. The apparatus in accordance with claim 3, wherein said computer means provides calibration for the apparatus, said calibration being performed by hardware included in said computer means.

71. The apparatus in accordance with claim 3, wherein said computer means comprises calibration means which calibrates for the apparatus, said calibration means comprising software.

72. A method of ascertaining the quality of milk by analyzing its color which comprises irradiating the milk being analyzed with electromagnetic radiations of predetermined intensity at a selected wavelength, receiving said radiation in a sensor, excluding from said radiation received in said sensor all radiations except radiation of said selected wavelength, analyzing all radiation at said selected wavelength as received and affected by said milk and converting such radiation to data, said milk substantially simultaneously receiving background electromagnetic radiation while receiving said electromagnetic radiation of said predetermined intensity, transmitting first data representing said simultaneously received radiation to a computer memory, discontinuing said radiation of predetermined intensity, and transmitting second data representing only said background electromagnetic radiation at said selected wavelength to a computer memory, comparing said first and second data, and displaying further data based on the comparison of said first and second data to represent the physiological characteristics of said milk.

* * * * *